United States Patent [19]

Matsushita et al.

[11] Patent Number: 4,939,400
[45] Date of Patent: Jul. 3, 1990

[54] TRANSMISSION APPARATUS HAVING SPLIT-COIL TYPE COAXIAL COUPLER

[75] Inventors: Akira Matsushita; Shohkichi Nakano, both of Kawasaki, Japan

[73] Assignee: Kabushiki Kaisha Nihon System Kenkyusho, Kawasaki, Japan

[21] Appl. No.: 312,002

[22] Filed: Feb. 17, 1989

[30] Foreign Application Priority Data

Feb. 19, 1988 [JP] Japan .................. 63-36824

[51] Int. Cl.⁵ .................. H02K 13/14; H02K 3/46
[52] U.S. Cl. .................. 310/208; 310/42; 310/68 D; 310/261; 310/DIG. 6
[58] Field of Search .................. 310/67 R, 68 R, 68 D, 310/72, 171, 208, 254, 261, 268, DIG. 6, 42, 263, 265; 333/256, 261

[56] References Cited

U.S. PATENT DOCUMENTS

| | | | |
|---|---|---|---|
| 2,760,127 | 8/1956 | Duncan et al. | 310/DIG. 6 |
| 4,445,057 | 4/1984 | Küter et al. | 310/68 D |
| 4,516,097 | 5/1985 | Munson et al. | 333/261 |
| 4,665,331 | 5/1987 | Sudo et al. | 310/DIG. 6 |
| 4,677,332 | 6/1987 | Heyraud | 310/268 |
| 4,734,603 | 3/1988 | von der Heide et al. | 310/72 |

FOREIGN PATENT DOCUMENTS 105905  5/1986  Japan .................. 333/261

Primary Examiner—Mark O. Budd
Assistant Examiner—D. L. Rebsch
Attorney, Agent, or Firm—Beveridge, DeGrandi & Weilacher

[57] ABSTRACT

An apparatus for transmitting electric power and information signals between a rotating element provided at a rotating shaft and a fixed element provided at the circumference of the rotating shaft. Both the rotating element and fixed element are configured as coils, and they perform transmission by an electromagnetic induction. Each coil is formed in a cylindrical form, and has a split structure comprising plural blocks which can be mounted on the shaft from the circumference of the rotating shaft. The rotating element and fixed element are mounted respectively on a rotating shaft of a machine and a fixed side of the machine, and electric power and information signals needed by the rotating element are transmitted from the fixed element.

6 Claims, 5 Drawing Sheets

TRANSMISSION APPARATUS HAVING SPLIT-COIL TYPE COAXIAL COUPLER

BACKGROUND OF THE INVENTION

1. Field of the Invention

This invention relates to a transmission apparatus having a split-coil type coaxial coupler for transmitting electric power, digital signals, digitized data signals or analog signals without making contact, using electromagnetic waves or electromagnetic induction. This invention is effectively used in, for example, NC machine tools, robot apparatus, carrying apparatus, driving handles of vehicles and the like, various other kinds of automatic machines and the like, when a moving-side module and a fixed-side module are mounted on a rotating body and a body of an apparatus, respectively. Electric power and command signals required at the rotating side and data signals (for example, a shape, position, temperature, color and the like) are transmitted from the rotating side to the fixed side.

2. Description of the Prior Art

As a transmission apparatus of this kind, there are known FM telemeters, various kinds of transmission apparatuses which utilize electromagnetic waves or light as a medium, wireless modems and the like. Recently, in particular, handling has become remarkably easier than in conventional cases in that, for example, by using a coaxial cylindrical coupler, a power supply needed at the rotating side is transmitted from the fixed side without making contact, and so the moving side needs no power supply.

Such a coaxial cylindrical coupler comprises inner and outer solenoid coils. There are many inconveniences, however, For example, when the solenoid coils are mounted on a rotating shaft, a hole having a diameter large enough for fitting the rotating shaft is provided at the inner side of a rotating-side module having the solenoid coil, and the module is mounted by threading the rotating shaft through the hole, or spools are arranged so as to be able to be divided into two portions, and coils are manually wound after installing the spools.

Apart from when a machine is newly manufactured, when the above-described module is to be mounted on an existing machine, or in the case of trouble after mounting the module, it is necessary to disassemble the machine to take out the rotating shaft, or wind or untie the coil. These operations are extremely troublesome.

SUMMARY OF THE INVENTION

It is an object of the present invention to provide a non-contacting transmission apparatus which comprises means for easily constituting an inner coil and an outer coil of a coaxial coupler without threading a rotating shaft and without employing a special spool.

A transmission apparatus having a split-coil type coaxial coupler of the present invention comprises an inner coil mounted on a rotating-body-side rotating shaft and a coaxial cylindrical coupler to which an outer coil is fixed and which is positioned at the outer circumference of the rotating shaft. Electric power can be transmitted as well as an information signal can be delivered and received from one to another of the coils without making contact. The apparatus comprises, for at least one of the coils, a cylindrical coil provided by combining plural blocks each comprising a split coil capable of being mounted on the circumference of the rotating shaft without threading through it.

In this case, in both the inner coil and outer coil, the numbers of the blocks to be combined in a cylindrical form, respectively, are different from each other, or the split coil comprises plural branch coils connected in series and parallel in each of the blocks. The present invention provides a considerable effect especially when applied to the configuration of a transmission apparatus which includes a photoelectric observation unit having an illuminating system and a photosensing system at the rotating body side.

BRIEF DESCRIPTION OF THE DRAWINGS

FIG. 14 illustrates a coaxial coupler configured by combining modules each comprising a coil, a capacitor, a power amplification circuit and the like.

DESCRIPTION OF THE PREFERRED EMBODIMENTS

An apparatus according to the present invention is roughly configured by a rotating-side module and a fixed-side module, and each module is further roughly divided into a transmitting block and a receiving block. By means of combining these elements, it is possible to perform transmission, reception, bidirectional transmission and the like.

In order to simplify explanation, however, an explanation will be now made of a transmission apparatus in which electric power required for operating the rotating-side module is transmitted from the fixed-side module without making contact, and data signals are delivered and received from the rotating-side module to the fixed-side module by means of electromagnetic waves using a split-coil type coaxial coupler of the present invention.

Figure 1:
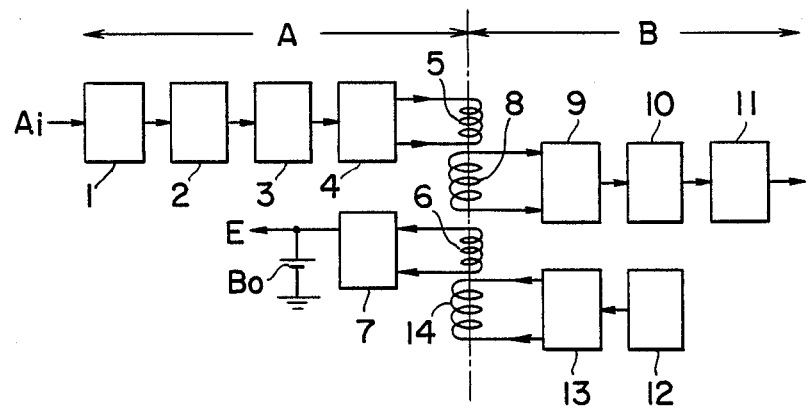
FIG. 1 is a block diagram showing an example of a transmission apparatus having a split-coil type coaxial coupler according to the present invention.

FIG. 1 shows block diagrams A and B for a rotating-side module and a fixed-side module, respectively.

In the rotating-side module A, input analog data Ai, such as a shape, strain, position, temperature, color and the like, are amplified in voltage by a preamplifier 1, then applied to an FM (Frequency Modulation) oscillation circuit 2 to become an FM wave, and multiplied in frequency by a frequency multiplication circuit 3 up to a frequency which is suitable for transmission. The data are further amplified in power by a power amplifier 4 for signals, and radiated into air by a transmitting coil 5 as an electromagnetic wave for signals.

An electromagnetic wave for electric power radiated from the fixed-side module B is received by a receiving coil 6 for electric power, converted into dc current by a rectifying smoothing circuit 7 to become a power supply E, which is supplied to each circuit within the rotating-side module A. The power may be supplied to sensors which need current, such as a strain gauge, platinum resistance wire and the like. It may charge a battery $B_0$ which compensates for variations in transmitting power produced by variations in the distance between the two modules.

On the other hand, in the fixed-side module B, the electromagnetic wave for signals transmitted from the rotating-side module A is received by a receiving coil 8 for signals, amplified by an RF amplifier 9, then restored into an analog signal by an FM detection circuit 10, and output to the outside via a buffer amplifier 11.

A power supply system for the rotating-side module A amplifies output power of an oscillation circuit 12 for electric power by a power amplifier 13 for electric power, and radiates the amplified power fro ma transmitting coil 14 for electric power as an electromagnetic wave.

As described above, this method has the feature that, since power which is necessary for the operation of the rotating-side module is transmitted from the fixed-side module to the rotating-side module, the rotating-side module can be operated without having a particular power supply.

In this case, coaxial cylindrical solenoid coils are used in the prior art as the transmitting coil 5 for signals, receiving coil 6 for electric power, receiving coil 8 for signals and transmitting coil 14 for electric power. Hence, the operation of mounting them on the rotating shaft has been extremely difficult.

On the contrary, a split-coil type coaxial coupler used in a transmission apparatus of the present invention is cylindrically or circularly configured by means of combining plural constituent elements which are called "blocks" in this specification and which are provided with split coils.

That is, at least two coils configured by circularly combining plural blocks are coaxially disposed, and delivery and reception of electric power or information signals are performed between inner and outer coils without making contact.

Figure 2:
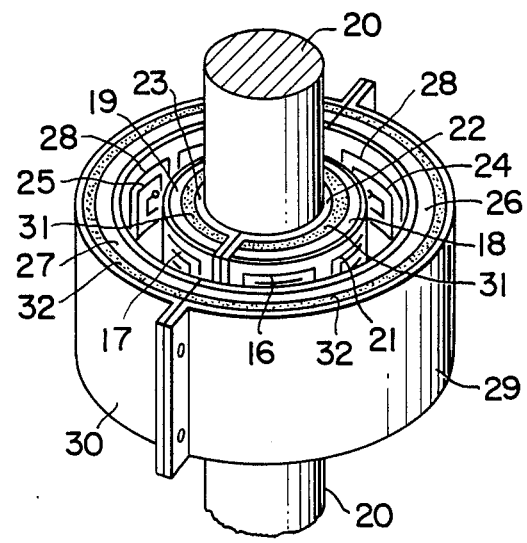
FIG. 2 is a perspective view showing state of an assembled state of a split-coil type coaxial coupler in the present invention.

FIG. 2 illustrates an entire image of a split-coil type coaxial coupler used in the present invention so that the basic configuration thereof can be easily understood. The coaxial coupler is configured by inner and outer coils each of which is divided into two portions. FIG. 2 shows an appearance of the coaxial coupler when printed flat coils are used as split coils.

As can be seen in FIG. 2, two inner blocks 18 and 19 provided with split coils 16 and 17, respectively, are cylindrically combined around a rotating shaft 20 to constitute an inner coil 21. In this case, the inner blocks 18 and 19 are directly mounted on the rotating shaft 20 by split sleeves 22 and 23. At the outer circumference of the inner coil 21, two outer blocks 26 and 27 provided with split coils 24 and 25, respectively, are cylindrically combined to constitute an outer coil 28, and they are supported and fixed by outer circumferential covers 29 and 30.

Ferromagnetic materials 31 and 32 indicated by hatching, which are made of, for example, ferrite, and which are provided whenever necessary in order to reduce losses due to the split sleeves 22 and 23 and the outer circumferential metal covers 29 and 30, are cylindrically connected, each being unified with each block, or properly disposed at electromagnetic regions of the split coils.

Figure 3:
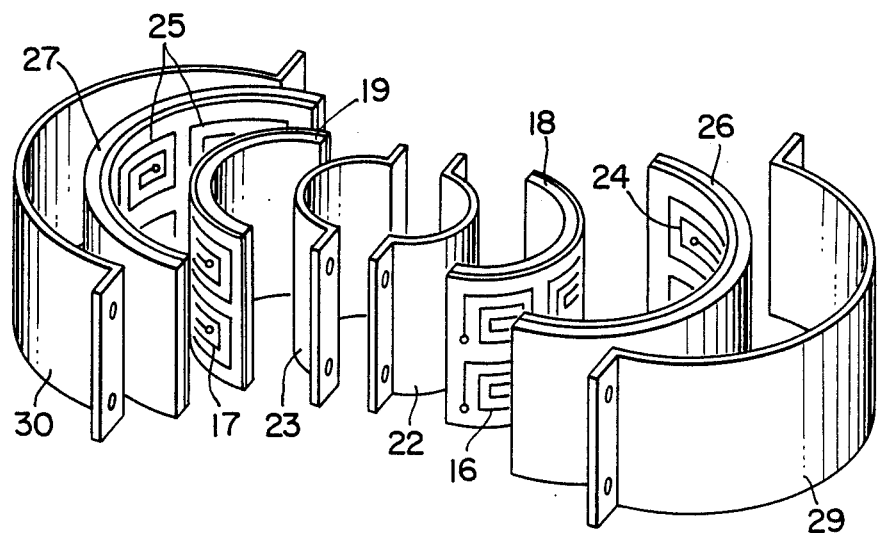
FIG. 3 is an exploded view of principal units thereof.

The principal constituent units of the split-coil type coaxial coupler shown in FIG. 2 are explodedly shown in FIG. 3.

That is, the inner coil is constituted by the two divided inner blocks 18 and 19 and the split sleeves 22 and 23. The outer coil is also constituted by the outer blocks 26 and 27 and the outer circumferential covers 29 and 30.

It is to be noted that each of the split coils 16, 17, 24 and 25 illustrated in FIG. 3 is further configured by plural coils connected in series or parallel within each block.

Figure 4:
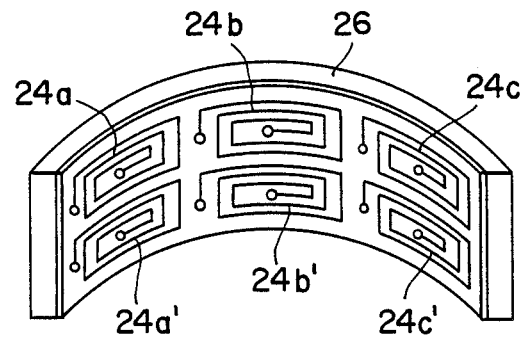
FIG. 4 shows of an outer block used for the configuration of an outer coil.

FIG. 4, for example, illustrates one outer block 26 used for the configuration of the outer coil 28. That is, the two pairs of split coils 24 are disposed at the inner surface of the block, one of the pairs further comprises three branch coils 24a, 24b and 24c for power transmission, and another of the pairs comprises three branch coils 24a', 24b' and 24c' for information-signal transmission.

Figure 5:
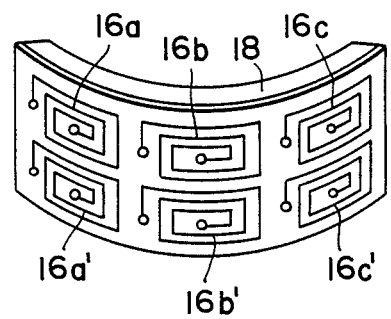
FIG. 5 illustrates an inner block.

Similarly, FIG. 5 illustrates the inner block 18 which has a radius of curvature smaller than that of the outer block 26, and which is configured by branch coils 16a, 16b and 16c for power transmission, and branch coils 16a', 16b' and 16c' for information-signal transmission.

Functions and effects when such flat coils are applied will now be described.

Figure 6:
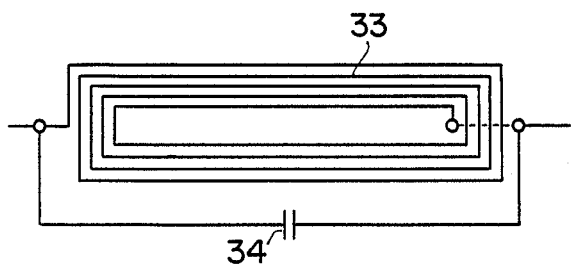
FIG. 6 is an expanded view showing a pattern example of a split coil.

For example, FIG. 6 is an expanded view of a split coil provided at one block. A cylindrical coil is formed by combining two blocks, each of which is provided with a split coil formed by semi-cylindrically bending a flat coil 33 having such a pattern. A so-called coaxial coupler will be now considered which is configured by a couple of an inner coil made of the above-described cylindrical coil mounted on a rotating shaft, and a fixed outer coil made of a block provided with split coils having a similar pattern at the outer circumference of the inner coil.

That is, when the inner coil is rotated, and a magnetic field is generated by passing a current through one of the coils (for example, the outer coil) and crossed with another coil, the distribution of the generated magnetic flux at the circumference becomes in general very nonuniform when any modification is performed.

Figures 7, 9:
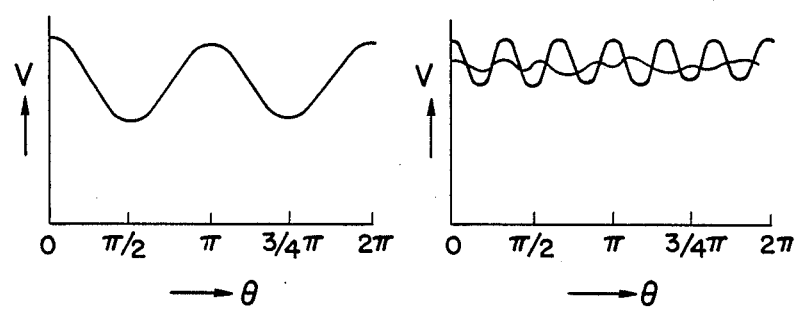
FIGS. 7 and 9 illustrate output voltages for explaining transmission characteristics of the coaxial coupler.

Thus, when, for example, a tuning circuit is made connecting a capacitor 34 as shown in FIG. 6, and an ac current is applied to one of the coils (for example, the outer coil) and an output voltage based on electromagnetic induction is measured at another coil, an output characteristic as shown in FIG. 7 is obtained. A coaxial coupler in which the output voltage V thus largely varies in accordance with the angle of rotation $\theta$ can be hardly put to practical use.

Figure 8:
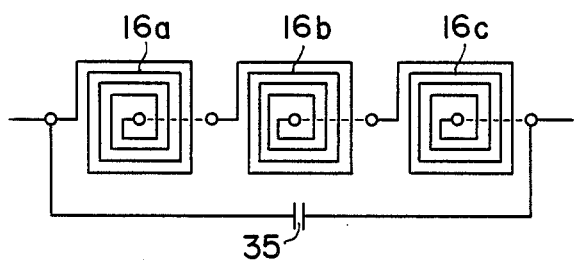
FIGS. 8 and 10 are expanded views showing pattern examples of split coils further comprising plural branch coils.

Now, a tuning circuit is formed connecting a capacitor 35 to branch coils 16a, 16b and 16c each of which is wound for each block as shown in FIG. 8. A coaxial coupler which is identical to the above-described one is configured by cylindrically combining a plurality of the tuning circuit. When an ac current is applied to one of the coils and an output voltage at another coil is measured, an output characteristic as shown by a full line in FIG. 9 is obtained, and it is possible to reduce ripples.

Furthermore, in a configuration in which many blocks having such branch coils are combined, or the numbers of the above-described blocks of the inner and outer coils which are cylindrically combined, respectively, are different, an excellent output characteristic having small ripples is obtained as shown by dotted lines in FIG. 9.

Figure 10:
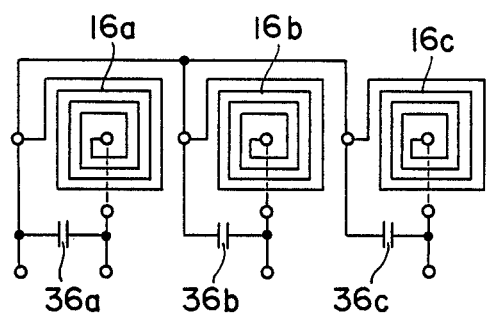

Similar functions and effects may be obtained when capacitors 36a, 36b and 36c are connected to branch coils 16a, 16b and 16c, respectively, as shown in FIG. 10, and each couple of the branch coil and capacitor is used as a tuning circuit.

Figure 11:
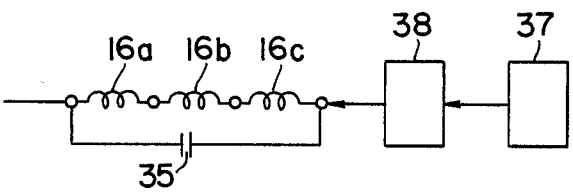
FIGS. 11 and 12 are diagrams illustrating driving circuits of the split-coil type coaxial coupler of the present invention.

The tuning circuit in which the capacitor is connected at both ends of the coils connected in series as shown in FIG. 8 can be operated by a driving circuit configured by an oscillation circuit 37 and a power amplification circuit 38 as shown in FIG. 11.

Figure 12:
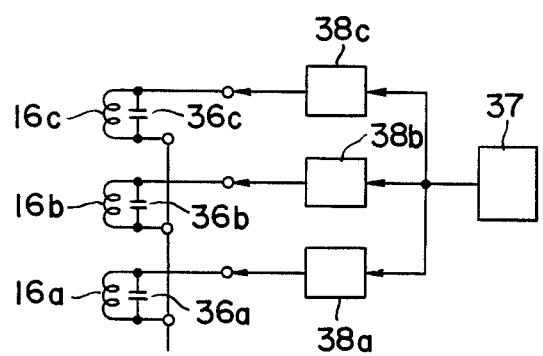

Relative to the tuning circuit in which a capacitor is connected to each of the coils connected in parallel as shown in FIG. 10, each coil may be driven by each of power amplification circuits 38a, 38b and 38c as shown in FIG. 12.

The use of flat coils using flexible printed circuit boards as split coils or branch coils renders the configurations of the above-described blocks having different curvatures relatively easy, and is also convenient when plural coils connected in series and parallel are configured within each individual block.

Although, as for the above-described embodiments and their functions and effects, flat coils have mainly been illustrated in order to be easily drawn as split coils, similar functions and effects may, of course, be also obtained when various blocks provided with various kinds of coils formed by winding enameled copper wires or the like are configured.

A required inductance can not sometimes be obtained by completely flat coils when, for example, a frequency to be used is low. In such cases, the number of turns of two-dimensional flat coils may be increased, or coils which are three-dimensionally laminated to provide a certain thickness or coils which also use cores made of ferrite or the like may be used.

Embodiments of the transmission apparatus to which such split-coil type coaxial couplers are applied will now be explained.

Figure 13:
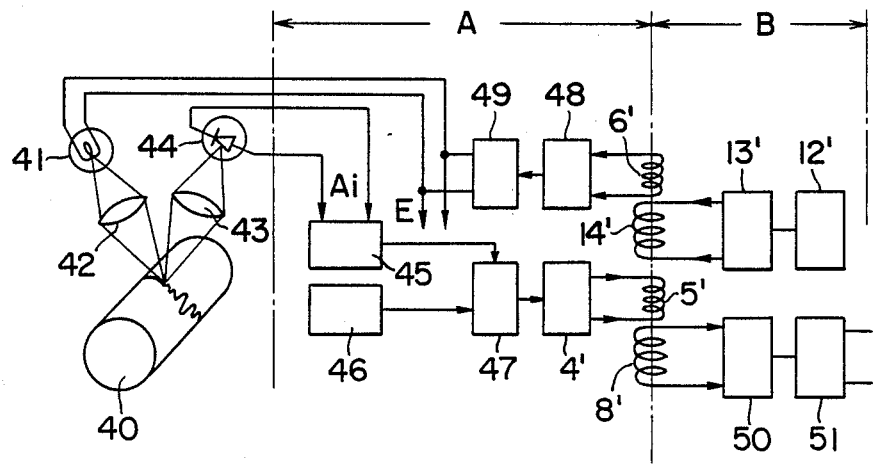
FIG. 13 is a block diagram of an embodiment for operating a photoeclectric observation unit provided in a rotating-side module A by electric power transmitted from a fixed-side module B.

FIG. 13 is a block diagram of an embodiment which includes a photoelectric observation unit in which a photosensor consisting of an illuminating system and a photosensing system is connected to a rotating-side module A operated by an electric power transmitted from a fixed-side module B, and which is configured to detect optical data such as a pattern, color, projections and recesses and the like of an outside object and transmit the data to the fixed-side module B.

An object 40 to be tested is disposed at an outside location, illuminated by an illuminating system consisting of a light-emitter 41, such as an LED, a lamp or the like, and an optical system 42, such as a lens, a mirror and the like. The reflected light which contains information about the pattern, color, projections and recesses and the like, of the object 40 is focused on a photosensor 44, such as a photodiode, phototransistor or the like, similarly by an optical system, such as a lens, a mirror and the like.

At the rotating-side module A, an electric output Ai of the photosensor 44 is amplified by a preamplifier 45, and subsequently applied to an FM circuit driven by an oscillation circuit 46 for signals which oscillate a carrier frequency for signal transmission to be made an FM wave, which is amplified in power by a power amplifier 4' for signals.

The amplified output is then transmitted to the fixed-side module B by a so-called transmitting coil 5' for signals. This coil 5' is one pair of coils for information-signal transmission described above of the inner coil in the split-coil type coaxial coupler according to the present invention.

Similarly, a receiving coil 6' for electric power which is another pair of coils for electric power transmission of the inner coil is coupled with a transmitting coil 14' for electric power of the fixed-side module B, that is, one pair of coils of the outer coil of the split-coil type coaxial coupler by means of electromagnetic induction function. Hence, the receiving coil 6' receives electric power transmitted in a frequency for electric power, which is made into dc power by a rectifying and smoothing circuit 48. The DC power is then supplied to each circuit within the rotating-side module A as a power supply E via a constant-voltage circuit 49.

On the other hand, at the fixed-side module B operated by a power supply such as a commercial ac line, a battery or the like, an output which is amplified in power by a power amplifier 13' for electric power driven by an oscillation circuit 12' for electric power oscillating a frequency for electric-power transmission is applied to a transmitting coil 14' which is one pair of coils of the above-described outer coil, and transmitted to the rotating-side module A.

A carrier wave for signals transmitted from the rotating-side module A induces a high-frequency voltage in another pair of coils of the outer coil of the split-coil type coaxial coupler in the fixed-side module B; that is, a receiving coil 8' for signals is demodulated into a signal Ai' corresponding to the original signal Ai by an FM receiving coil 50, and detected via a buffer amplifier 51.

Thus, means in which a split-coil type coaxial coupler is used as a mechanism for directly performing transmission of electric power and delivery and reception of signals provides a high effect which could never be achieved in the prior art, not only when this kind of apparatus having a rotating unit is newly established but also when many photoelectric observation units are further increased at the rotating side.

On the other hand, diameters of rotating shafts to which such couplers are to be provided are very diverse, and so it is very troublesome to form couplers each of which has dimensions corresponding to each diameter. In such cases, if flexible printed circuit boards are used as a material for split coils or branch coils as described above, and flexible materials are also used for other components, configuration of the above-described blocks having different curvatures become relatively easy.

The following method further provides means which can easily deal with such cases. In a circuit shown in FIG. 12, each circuit unit consisting of a coil and a capacitor, such as a branch coil 16a and a capacitor 36a, a branch coil 16b and a capacitor 36b, and a branch coil 16c and a capacitor 36c, or only a coil is configured as a slender unit 52.

Figure 14:
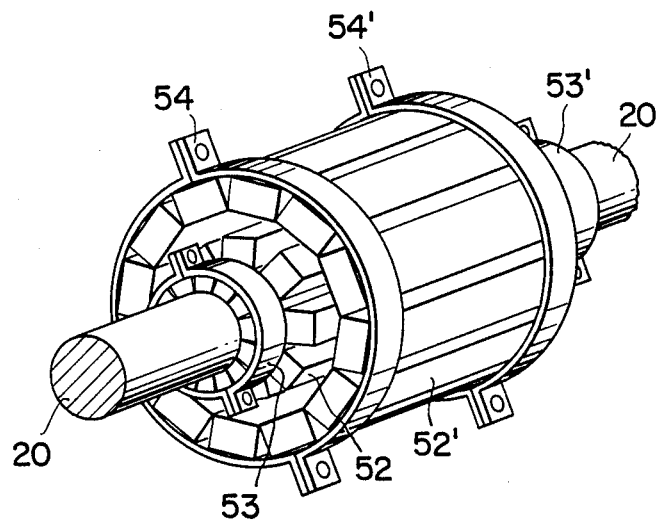

A rotating-side module A is configured by cylindrically combining these units 52 by rotating-side fasteners 53 and 53' as shown in FIG. 14, and a fixed-side module B is configured by similarly combining units 52' by fixed-side fasteners 54 and 54'. This method has the feature that the modules can be easily adapted to a rotating shaft having any diameter by adjusting numbers of the units 52 and 52'.

In this case, necessary circuit units such as a power amplification circuit 38 shown in FIG. 12 and the like may be incorporated in each unit 52 whenever necessary, and necessary circuit units may also be incorporated in each unit 52'.

In general, the method of providing coils is a problem in such couplers. If circuit units are provided as modules by means as described above, the problem is solved because the modules can be easily provided and connected anywhere.

Heretofore, contact-type transmission apparatus such as slip rings or the like have been used in such applications. However, these apparatus have many disadvantages that there are many noises, wear is large when the number of rotations is large, maintenance is troublesome, and the like. According to the present invention, the apparatus can be semipermanently used since there are no consumable units, and they are easily repaired without disassembling an installed apparatus even when a trouble occurs.

Heretofore, coaxial cylindrical solenoid coils have been mainly used, even when electric power and information signals are transmitted by a coaxial coupler. However, in order to mount these cylindrical coils to a rotating shaft or the like of a ready-made machine by threading through the shaft, fairly troublesome operations are required, such as disassembling the machine to take out the rotating shaft, mounting split spools to the rotating shaft, followed by manually winding coils, or the like.

The use of the split-coil type coaxial coupler of the present invention has the effect that an inner coil and an outer coil can be easily configured by only combining plural blocks even for a rotating shaft of a ready-made machine.

Consequently, it becomes unnecessary to disassemble a machine when an apparatus of the present invention is mounted in a moving mechanism of various kinds of machines such as production machines and the like, or when subsequent maintenance is performed.

Thus, not only when a novel split-coil type coaxial coupler of the present invention is mounted on a ready-made machine, but also when a machine relating to the coaxial coupler has trouble, it is possible to greatly reduce the downtime. Moreover, great effects can be expected such that even a person unfamiliar with handling this kind of mechanism can easily achieve the object of application of the present invention.

When a frequency to be handled is high, an effect for reducing losses caused by conductors such as the rotating shaft 20, the outer circumferential cover 29 and the like can be provided, by means of positioning the ferromagnetic inner core 31 and outer core 32 as explained in FIG. 2.

What is claimed is:

1. A transmission apparatus having a split-coil type coaxial coupler, comprising
    an inner coil mounted on a rotating shaft,
    a cylindrical coupler member which is coaxial with respect to said inner coil,
    an outer coil fixed to said coupler member,
    said outer coil being positioned at the outer circumference of the inner coil without making contact with the inner coil,
    means connected to a said coil for providing electric power for non-contact transmission to another said coil,
    means connected to a said coil for providing an information signal for non-contact transmission to another said coil,
    at least one of said coils being a cylindrical coil formed of plural blocks which each comprise a split coil which is mounted on said shaft without threading through said rotating shaft.

2. A transmission apparatus having a split-coil type coaxial coupler according to claim 1, wherein unit components relating to electromagnetic coupling comprising coils and the like are made units, and a rotating-side module and a fixed-side module are formed by cylindrically combining said units, thereby become easily adaptable to rotating shafts having different diameters by properly providing the numbers of the units.

3. A transmission apparatus having a split-coil type coaxial coupler according to claim 1, wherein said split coil comprises plural branch coils connected in series and in parallel in each of said blocks.

4. A transmission apparatus having a split-coil type coaxial coupler according to claim 3, wherein said split coils and branch coils are formed by flat coils.

5. A transmission apparatus having a split-coil type coaxial coupler according to claim 1 further comprising a photoelectric observation unit comprising an illuminating system and a photosensing system at the side of said rotating body.

6. A transmission apparatus having a split-coil type coaxial coupler according to claim 1, wherein the inner and outer blocks are flexible so that they can be adapted to rotating shafts having different diameters.

* * * * *